Dec. 13, 1960     A. J. TIERI     2,963,733
OPHTHALMIC MOUNTING HINGES
Filed March 8, 1956
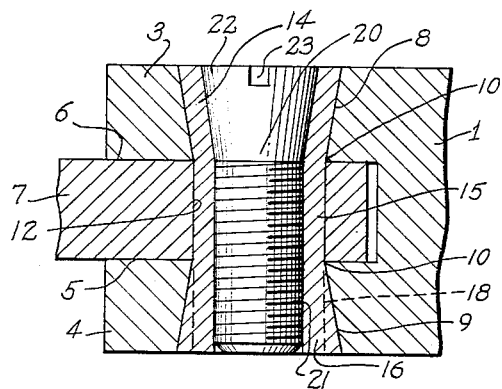
INVENTOR.
Arthur J. Tieri
BY Ralph T. Bassett
Attorney United States Patent Office 2,963,733
Patented Dec. 13, 1960

2,963,733

OPHTHALMIC MOUNTING HINGES

Arthur J. Tieri, Southbridge, Mass.
(60 Franklin St., Worcester, Mass.)

Filed Mar. 8, 1956, Ser. No. 570,357

1 Claim. (Cl. 16—169)

This is a continuation-in-part of my application Serial No. 305,107, filed August 19, 1952, and now Patent No. 2,774,098.

This invention relates to improvements in the manufacture of eyeglass and spectacle connections and in temple connections therefor and comprehends hinge means capable of securing and holding associated parts against misalignment and separation.

Another object of the invention is the use of an aligning and fastening member of generally tubular form which can be deformed to prevent axial displacement of the associated parts.

Another object of the invention is the provision of means for maintaining the associated parts of a hinge connection of the type in question against misalignment or displacement, whereby the function of the assembly will be maintained during the life of the structure.

More specifically the invention comprehends the use of associated hinge parts in which a tubular core is conically displaced at the ends of the assembly by the insertion of a pin, the displacement of the core being such as to bind the associated parts and simultaneously secure the pin against axial movement and displacement.

Another object of the invention is to provide a core which is inserted in a bore formed in a plurality of parts to be pivoted together, the bore being of uneven contour in the direction of its length for the reception of a core, the core being capable of lateral displacement to completely fill teh irregular bore by means of a pin conforming generally to the shape of the bore, whereby the shape of the pin will cause the core to assume the shape of the bore to retain the various parts against separation and displacement.

Other features of the invention will more clearly hereinafter appear by reference to the accompanying drawings, wherein like characters of reference designate corresponding parts throughout the several views, in which the drawing shows a vertical section of a fastener constructed in accordance with the present invention and in which the fastening pin includes a threaded shank and a tapered head.

The present invention pertains particularly to ophthalmic mountings and analogous arts and contemplates the provision of means for hinging associated parts so that when they are assembled they will be held against misalignment and the joint will not loosen and the parts separate or become distorted from their proper hinge axis. The invention contemplates the use of a soft metal or plastic tube, the tube being of nylon or Teflon and while capable of being deformed it will still retain its deformed shape to provide the essential features of the invention. The use of Teflon, as, an example, is mentioned because of its inherent lubricating characteristics as is well known in the art.

In the disclosure an ophthalmic mounting is shown at 1 and includes the two hinged jaws 3 and 4 suitably spaced apart to provide flat parallel faces 5 and 6. Between these jaws there is arranged an element or lug 7 of a dimension to fit snugly between the faces 5 and 6. The lug 7 has flat faces which lie flush against the faces 5 and 6 to form a neat hinge assembly. The jaws 3 and 4 are shown formed of inwardly tapered sockets 8 and 9, the walls of these sockets being generally in the shape of truncated cones and being of identical size so that their inner reduced terminals 10 are aligned. The lug 7 is formed with a cylindrical opening 12 of the same diameter as the reduced area 10 of the conical sockets. To provide a hinge connection for these parts a deformable tube, as heretofore mentioned, is provided, the tube having an upper conical portion 14, a medial cylindrical portion 15 and a lower tapered thickened wall area 16, the latter at the time of insertion in the aligned openings being of cylindrical form and with a diameter indicated by the dotted line 18, thereby placing the bottom thickened wall portion 16 so that a portion of the wall area is in the path of the screw 20. The screw 20 is provided with self-tapping threads 21 throughout its shank portion and with an upper tapered portion 22 having a recess 23 for the reception of the blade of a screw driver or the like.

By this construction, the screw 20 when forced into the soft tubular core will force the lower portion 16 outwardly to the full line position and the area between the screw and the conical wall 9 is such as to neatly receive this thickened tapered lower portion of the tube and prevent vertical movement thereof through the bore 12 in the lug 7. The outwardly tapered portion 14 of the tubular core is held against its conical seat 8 by the tapered head portion 22 of the screw. By this structure the axial displacement of the core in either direction is prevented and the self-threading screw has the inherent characteristics of binding itself into the threaded area, thus preventing rotation or axial displacement. It will be noted in this structure that the head of the screw and of the tube is flush with the upper face of the upper hinge element 3 and that the lower end of the screw is so constructed and arranged as to terminate flush with the bottom face of the jaw 4. Likewise the bottom face of the tube lies flush with the adjacent outer end of the screw and with the bottom face of the jaw 4. This forms a neat hinge joint in which all of the parts are secured against displacement and inasmuch as there is no play between any of the parts there is no chance for these parts to become worn and thereby become misaligned so as to form an unsatisfactory joint.

It is to be understood that where the invention is used in an ophthalmic mounting, the pin and tube are so constructed and arranged that allowance will be made for just sufficient tension. This is accomplished by predetermining the dimensions of the parts, including the height of the hinge assembly. By this means when making a temple adjustment, the hinge bends as a unit always keeping the hinge assembly in alignment without stripping or bending the threads as would ordinarily happen in a screw assembly. It will be understood that when the pin is positioned into the tube and the flat surfaces compressed, the temple will move easily regardless of how hard the hinge surfaces are compressed together. Obviously this is accomplished by proper predetermined tension control.

What I claim is:

In a hinge assembly connecting a temple member to one end of an ophthalmic frame member, and wherein one of said members has a pair of spaced upper and lower hinge parts between which is fitted an intermediate lug element on the other member and in which each of said spaced hinge parts has a conical opening formed therethrough tapering inwardly from its outer face and said intermediate lug element has a cylindrical opening therethrough coaxial with both of said conical openings, a tubular hinge member of relatively soft material having a preformed flared end portion for engaging the wall of one of said conical openings, and a normally contracted thickened wall portion of reduced diameter at its other end, a core for said tubular hinge member formed with a conical portion for snugly seating in said conical opening and an end portion of such a diameter as to engage and expand the thickened contracted wall portion into engagement with the wall of the flared opening, said end portion being formed with self-tapping threads to insure locking of the parts together.

References Cited in the file of this patent

UNITED STATES PATENTS

| | | |
|---|---|---|
| 1,150,114 | Hays | Aug. 17, 1915 |
| 1,413,998 | Templeton | Apr. 25, 1922 |
| 1,616,965 | Fielding et al. | Feb. 8, 1927 |
| 1,965,230 | Gasstrom | July 3, 1934 |
| 2,264,747 | Fether | Dec. 2, 1941 |
| 2,292,467 | Norsell | Aug. 11, 1942 |
| 2,366,965 | Johnson | Jan. 9, 1945 |
| 2,774,098 | Tieri | Dec. 18, 1956 |
| 2,828,668 | De Angelis | Apr. 1, 1958 |